United States Patent [19]
Weber et al.

[11] 3,910,368
[45] Oct. 7, 1975

[54] RIDER FOR WEEDING SOYBEANS

[76] Inventors: John H. Weber; John Roger Weber, both of Rte. 1, Anchor, Ill. 61720

[22] Filed: June 26, 1973

[21] Appl. No.: 373,623

[52] U.S. Cl. .............................................. 180/26 R
[51] Int. Cl.² ..................... B62D 61/08; B62D 1/02
[58] Field of Search ........ 180/26 R, 26 A, 27, 25 R, 180/25 A; 280/87.1, 92; 115/70; 114/146, 153

[56] References Cited
UNITED STATES PATENTS

| | | | |
|---|---|---|---|
| 2,092,388 | 9/1937 | Caulkins | 280/87.1 UX |
| 2,218,064 | 10/1940 | Amsbury | 280/87.1 X |
| 2,660,447 | 11/1953 | Bear | 280/87.1 |
| 2,672,248 | 3/1954 | Holliday | 180/26 R |
| 2,855,755 | 10/1958 | Auger | 114/146 X |
| 2,957,534 | 10/1960 | Burdett | 180/26 R |
| 3,033,301 | 5/1962 | Blue et al. | 180/26 R |
| 3,351,151 | 11/1967 | Miller et al. | 180/26 R |
| 3,371,641 | 3/1968 | Rohman et al. | 114/153 |
| 3,788,415 | 1/1974 | Tilley | 180/26 R |

FOREIGN PATENTS OR APPLICATIONS

| | | | |
|---|---|---|---|
| 213,244 | 8/1956 | Australia | 180/26 R |
| 596,211 | 12/1947 | United Kingdom | 180/26 R |

Primary Examiner—Trygve M. Blix
Assistant Examiner—Gregory W. O'Connor
Attorney, Agent, or Firm—Clarence A. O'Brien; Harvey B. Jacobson

[57] ABSTRACT

A vehicle particularly intended for use in weeding soybeans has a frame provided with a plurality of wheels arranged for permitting the frame to steerably traverse a supporting surface. One of the wheels is mounted on a steering post which is arranged to be selectively turned and pivot the wheel to steer the vehicle. The steering post may be controlled in any of a plurality of different ways. These include the use of a handwheel connected to the steering post for turning same upon being selectively turned by an operator, a foot rest element cantilever mounted on the steering post and arranged for being selectively engaged by at least one foot of the operator, and a handle mounted on the element and arrangeable for selective manipulation by the operator to lead the vehicle. A prime mover mounted on the steering post is arranged for selectively rotating the pivotal wheel and propelling the vehicle.

15 Claims, 6 Drawing Figures

RIDER FOR WEEDING SOYBEANS

BACKGROUND OF THE INVENTION

1. Field of the Invention

This invention relates generally to a steerable self-propelled vehicle, and particularly to such a vehicle specifically intended for permitting an operator to ride through a soybean field, and the like, and conveniently cut weeds and other vegetation.

2. Description of the Prior Art

When cultivating such crops as soybeans, a problem arises with regards to performing weeding operations, and the like, in that the relation of the crops with respect to the weeds is such that conventional types of machinery are unsuited for the purpose. As a result, an individual must pass down the rows of a field with a conventional cutting instrument, such as a sickle, and cut the weeds. Since a field of soybeans may cover several thousand acres, it can be readily appreciated that a pedestrian weed cutter is economically prohibitive.

It is known to use small self-propelled vehicles of usually three wheels to perform various agricultural operations. Examples of such vehicles are shown in U.S. Pat. Nos. 2,508,605, 2,644,540, 2,701,022, 2,993,551, and 3,033,301. None of these known vehicles, however, is constructed in such a manner that would permit a rider on the vehicle to be in a position convenient for cutting weeds as the vehicle is directed down a row of soybeans, and the like.

SUMMARY OF THE INVENTION

It is an object of the present invention to provide a riding machine or vehicle specifically intended for permitting a rider to cut weeds, and the like, from rows of soybeans and similar crops.

It is another object of the present invention to provide a steerable riding vehicle in which the steering can be controlled in any of a plurality of different ways in order that weeding and steering operations can be properly executed.

These and other objects are achieved according to the present invention by providing a vehicle having: a frame; a steerable wheel assembly attached to the frame for permitting the frame to steerably traverse a supporting surface; and a steering control assembly actuatable in a plurality of different ways connected to the steerable wheel assembly for controlling same.

According to a preferred embodiment of the present invention, the steerable wheel assembly includes three wheels connected to and arranged for movably supporting the frame. At least one of these wheels is pivotally mounted with respect to the frame, and the steering control assembly is associated with this pivotally mounted wheel. A steering post is advantageously turnably journaled on the frame, and is arranged extending along an axis perpendicular to the surface supporting the vehicle. The pivotally mounted wheel is rotatably mounted on the steering post for turning therewith and thereby being made pivotal with respect to the frame.

A preferred embodiment of the steering control assembly has a handwheel connected to the steering post for turning same upon being selectively turned by an operator to form a first manner of steering. A second manner of steering is formed by a foot rest element cantilever mounted on the steering post and arranged for being selectively engaged by at least one foot of the operator so as to turn the steering post as desired. The third manner of steering has a handle mounted on the foot rest, and arranged for selective manipulation by the operator to lead the vehicle as around a corner at the end of a row.

A prime mover may be mounted on the steering post, and a clutch lever associated with the foot rest arranged connected to the prime mover for selectively connecting same to the pivotally mounted wheel. In this manner, the vehicle is made self-propelled. The handle forming the third manner of steering as set out above is pivotally mounted on the foot rest and is arranged for actuating the clutch when in an operator-manipulating position. A preferred embodiment of a frame for a vehicle according to the present invention provides three longitudinal members arranged in plan to form the sides of a triangle. The wheels are then arranged at vertexes of the triangle, and a pair of longitudinal rods are arranged parallel to the steering post. Each of these rods is connected at a one end to an end of a common longitudinal member, and to an end of a respective one of the other longitudinal members. The ends of the other longitudinal members spaced from the ends connected to the longitudinal rods converge together and are provided with collars forming a journal for the steering post.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Referring now more specifically to FIGS. 1 to 4 of the drawings, a vehicle 10 according to the present invention has a frame 12, a steerable wheel assembly 14 attached to frame 12 and arranged for permitting frame 12 to steerably traverse a supporting surface S, and a steering control assembly 16 actuatable in a plurality of different ways and connected to wheel assembly 14 for controlling same.

Figure 1:
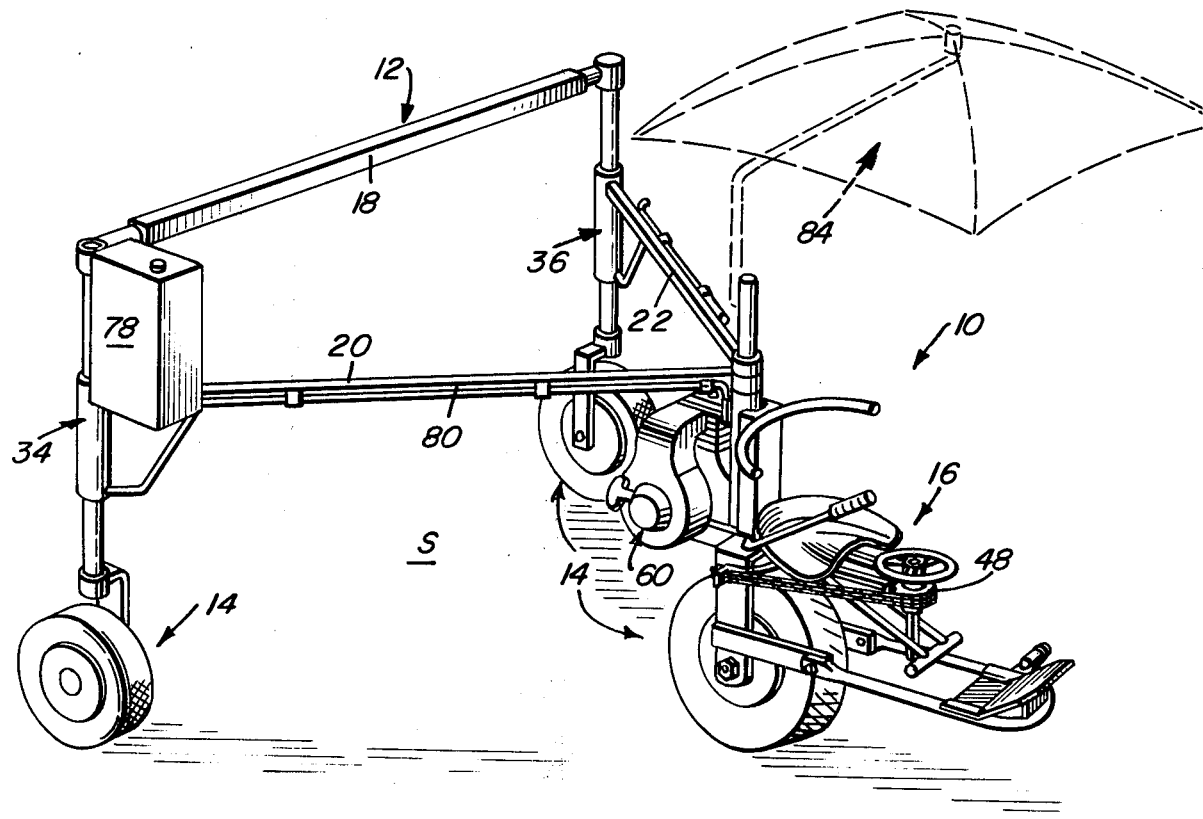
FIG. 1 is a perspective view showing a riding vehicle according to the present invention.
Figure 2:
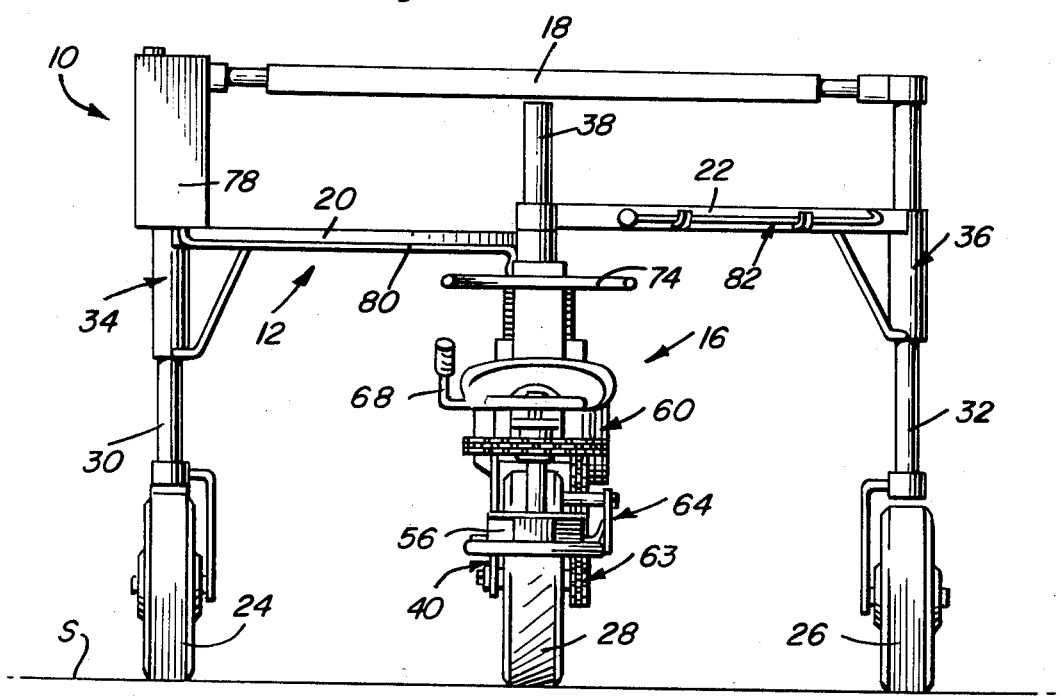
FIG. 2 is a front elevational view showing the vehicle of FIG. 1.
Figure 3:
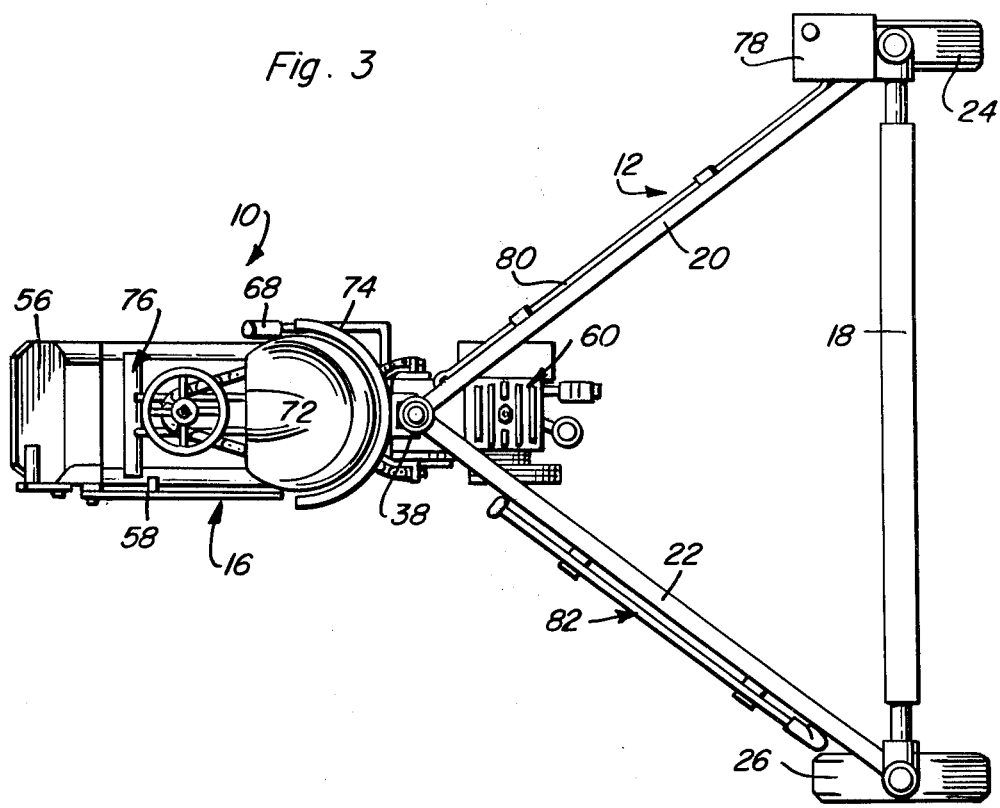
FIG. 3 is a top plan view showing the vehicle of FIGS. 1 and 2.
Figure 4:
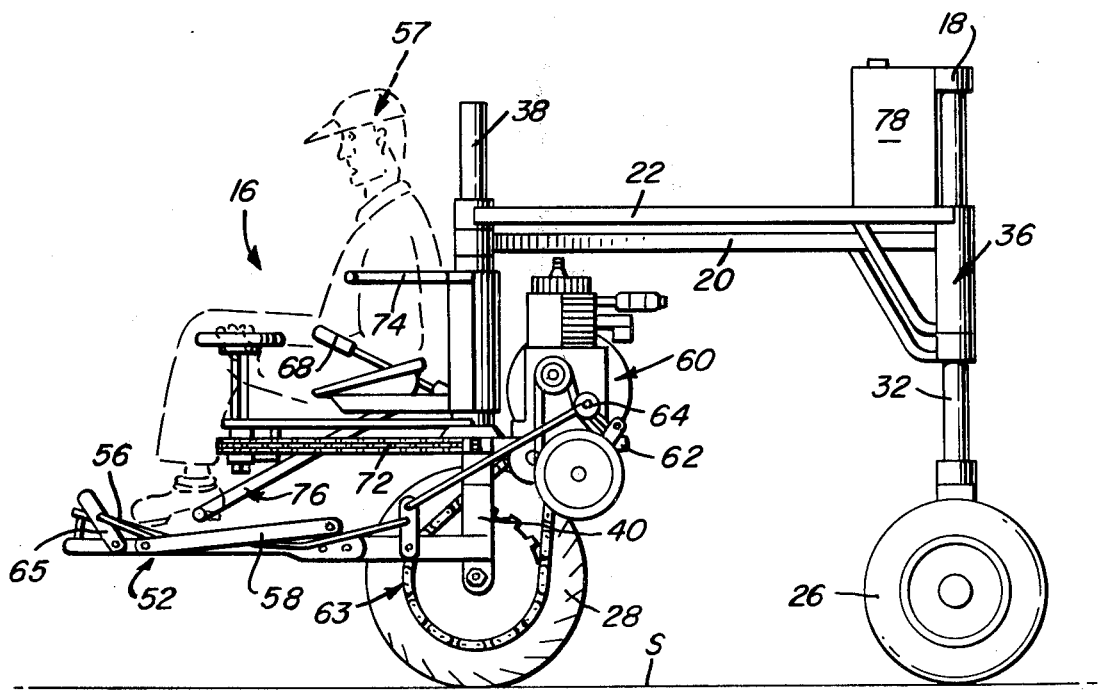
FIG. 4 is a side elevational view showing the vehicle of FIGS. 1 to 3.

Frame 12 is constructed from three longitudinal members 18, 20, and 22 arranged in plan to form the sides of a triangle. This is best seen in FIGS. 1 and 3 of the drawings. Wheel assembly 14 is formed by wheels 24, 26, and 28 arranged at the vertexes of the triangle formed by members 18, 20 and 22. A pair of longitudinal rods 30 and 32 are arranged parallel to one another and perpendicular to surface S. Each rod 30, 32 is connected at a one end to an end of common longitudinal member 18 and to an end of a respective one of the other longitudinal members 20, 22, These connections may be made in any conventional manner, such as is shown in the drawing. The other ends of longitudinal members 20, 22, spaced from the ends connected to rods 30, 32, are arranged converging together, and are provided with collars forming a journal for a steering post to be described below. Members 20, 22 may be attached to rods 30, 32 as by conventional assemblies 34 and 36.

Wheel 28 is pivotally mounted on frame 12, and steering control assembly 16's association with wheel assembly 14 is specifically with wheel 28.

Wheel assembly 14 further includes a steering post 38 turnably journaled on frame 12, specifically by the collars at the adjacent ends of longitudinal member 20 and 22, and is arranged extending along an axis perpendicular to supporting surface S and parallel to rods 30 and 32. Wheel 28 is rotatably mounted on a fork 40 provided at the lower end of post 38 for turning therewith and thereby being pivotally mounted with respect to frame 12.

Figure 5:
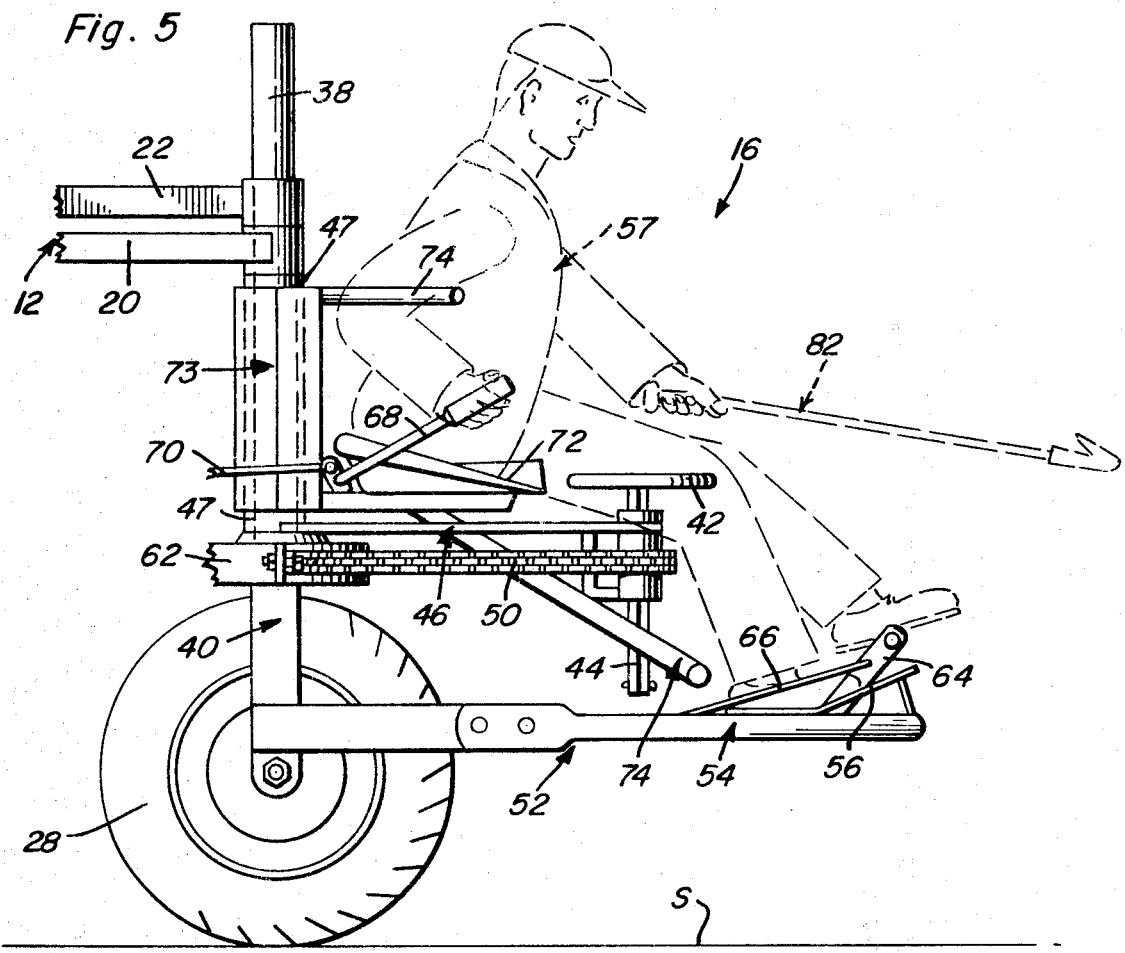
FIG. 5 is a fragmentary, side elevational view showing the front end of the vehicle of FIGS. 1 and 4, and drawn to a larger scale than the previous figures for showing details of the steering control assembly thereof.
Figure 6:
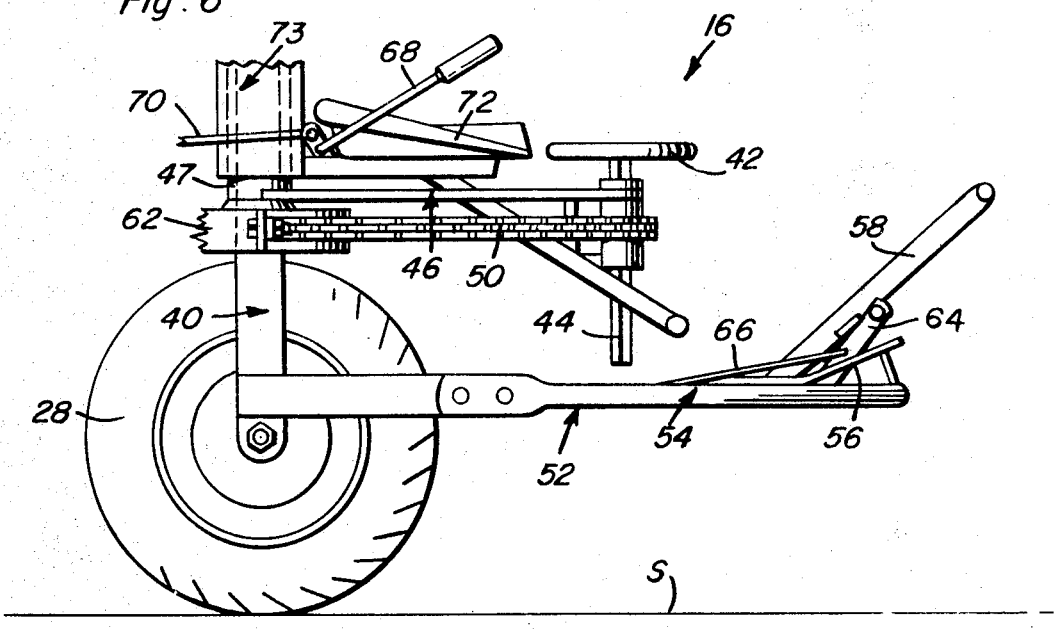
FIG. 6 is a fragmentary, side elevational view generally similar to FIG. 5, but with certain parts removed and a handle in position for permitting an operator to lead the vehicle.

Referring now to FIGS. 5 and 6 of the drawings, the plurality of arrangements provided in steering control assembly 16 for controlling wheel 28 will now be described. The first is formed by a handwheel 42 mounted on a shaft 44 journaled in a portion of a bracket 46 cantilever mounted on a sleeve 47 affixed to and forming an extension of frame 12 so that bracket 46 is affixed to frame 12. This handwheel 42 is provided with a sprocket 48 (FIG. 1) cooperating with a chain 50 anchored at spaced ends to fork 40. Shaft 44 is adjustably journaled on bracket 46 to permit the position of handwheel 42 to be adjusted. By using a shaft having a, for example, rectangular cross section, shaft 44 is easily keyed to sprocket 48. Handwheel 42 is used primarily when vehicle 10 comes to the end of a field and it is necessary to turn a sharp corner.

The second, and primary manner of steering vehicle 10 involves foot rest 52 cantilever mounted on steering post 38. This foot rest 52 is formed by a framework 54 having mounted thereon a plate 56 at the free or outer end thereof. Foot rest 52 is arranged so that plate 56 may be selectively engaged by at least one foot of an operator 57. An operator 57 may, by engaging platform 56 with his feet, push on platform 56 in the direction he wishes to go. Platform 56 is connected to wheel 28 by framework 54 so that when platform 56 is pushed to the right or left the vehicle 10 turns accordingly.

The third manner of steering vehicle 10 involves a handle 58 pivotally mounted on framework 54. When moved to the position shown in FIG. 6 of the drawings, handle 58 may be selectively manipulated by an operator 57 to lead vehicle 10 when, for example, crossing the rows at the end of a field and the ground is so rough the operator must dismount and turn the machine by hand. Framework 54 forming foot rest 52 extends from vehicle 10 in a direction of movement of the vehicle so as to form a forwardmost portion of vehicle 10. This arrangement of framework 54 can be readily appreciated by studying the figures of the drawings.

A prime mover 60 (FIGS. 1 to 4), which may be, for example, a conventional gasoline engine, is mounted on steering post 38 for movement therewith as by a cantiliver platform 62. A conventional chain and sprocket assembly 63 (FIG. 4) selectively connects the engine to wheel 28. The selective connection is realized as by a conventional clutch mechanism 64 actuated by a clutch lever 65 associated with foot rest 52 by being pivotally mounted on framework 54 and connected to the clutch by a conventional linkage 66. The speed of prime mover 60 is controlled as by a throttle lever 68 pivotally mounted on bracket 46 and connected to prime mover 60 as by a conventional linkage 70.

A seat 72 is mounted on a cantilever arm of a vertically adjustable bracket 73 for providing operator 57 with a place to sit while riding vehicle 10. A backrest 74 is also mounted on bracket 73 to provide additional support for the operator. A T-bar 76 is cantilever mounted to bracket 73, and indirectly to frame 12 by sleeve 47, for movement with the seat, and is arranged for selectively receiving the operator's feet. In particular, the operator would place one or more of his feet on T-bar 76 when using handwheel 42.

A container 78 is mounted on frame 12 as by being attached to longitudinal member 18 to serve as a fuel tank for the engine. A conventional line 80 connects container 78 and prime mover 60. A conventional cutting instrument 82, such as a sickle and the like, may be stored in brackets provided for the purpose on longitudinal member 22. FIG. 5 of the drawings shows operator 57 with an instrument 82 in his hand. A conventional umbrella 84 (FIG. 1), and the like, may be arranged as on the upper end of steering post 38 in a conventional manner to provide a canopy for operator 57.

The operator of a vehicle 10 when weeding soybeans, and the like, may be readily understood from the above description and from the drawings. Operator 57 sitting on seat 72 can steer vehicle 10 by using his feet and pushing against plate 56. In this manner, operator 57 has both hands free to work, and he can easily steer vehicle 10 down, for example, soybean rows. These rows are generally straight rows. Thus, foot rest plate 56 forms the primary steering system. When desiring to turn a corner as at the end of a row, operator 57 can slide handwheel 42 into his lap and turn same. Rotation of handwheel 42 rotates sprocket 46, moves chain 50, and pivots wheel 28 and foot rest 52, thus turning vehicle 10. In addition, the steering wheel unit acts as a stabilizer and stabilizes wheel 28 against shocks. When turning to the left or right, as seen in the drawings, extension of linkage 66 will actuate clutch 64, and enable the operator to place both feet on T-bar 76. Finally, when the operator reaches rough ground, and the like, he may dismount from vehicle 10 and pivot handle 58 into the position shown in FIG. 6 of the drawings. As can be readily appreciated from FIG. 6 of the drawings, when handle 58 is in this position it will contact clutch lever 65 and connect prime mover 60 to wheel 28. With the clutch engaged, operator 57 can pivot wheel 28 by using handle 58. Vehicle 10 will now turn under its own power. The primary advantage of using handle 58 is in making tight turns. An operator 57 will normally cut weeds in, for example, four rows of soybeans during a single traverse of a field. Accordingly, at the end of the field he must turn around very sharply in order to cover the next four rows. It is often extremely rough, however, when turning around on the end rows. Thus, it may be easier for the operator if he dismounts at the end of the field and uses handle 58 to turn vehicle 10 amound and line it up with the next four rows.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A vehicle, comprising, in combination:
   a. a frame;
   b. steerable means attached to the frame for permitting the frame to steerably traverse a supporting surface; and
   c. means actuatable in a plurality of different ways for controlling the steerable means, the means for controlling including a handwheel means connected to the steerable means for manipulating same upon being selectively turned by an operator, a foot rest cantilever mounted to the steering means and arranged for being selectively engaged by at least one foot of the operator to control direction of the steerable means, and a handle mounted on the foot rest and arrangeable for selective manipulation by the operator to lead the vehicle, the foot rest extending from the vehicle in a direction of movement of the vehicle so as to form a forwardmost portion of the vehicle.

2. A structure as defined in claim 1, wherein the steerable means includes three wheels connected to and arranged for movably supporting the frame, at least one wheel being pivotal with respect to the frame, and the means for controlling is associated with the pivotal wheel.

3. A structure as defined in claim 2, wherein the steerable means further includes a steering post turnably journaled on the frame and arranged extending along an axis perpendicular to the supporting surface, and the pivotal wheel is rotatably mounted on the steering post for turning therewith and thereby being pivotal with respect to the frame.

4. A vehicle, comprising, in combination:
   a. a frame;
   b. steerable means attached to the frame for permitting the frame to steerably traverse a supporting surface, the steerable means including three wheels connected to and arranged for movably supporting the frame, at least one wheel being pivotal with respect to the frame, a steering post turnably journaled on the frame and arranged extending along an axis perpendicular to the supporting surface, and the pivotal wheel being rotatably mounted on the steering post for turning therewith and thereby being pivotal with respect to the frame; and
   c. means actuatable in a plurality of different ways for controlling the steerable means, the means for controlling being associated with the pivotal wheel and steering post, and including a handwheel means connected to the post for turning same upon being selectively turned by an operator, a foot rest cantilever mounted on the steering post and arranged for being selectively engaged by at least one foot of the operator, and a handle mounted on the foot rest and arrangeable for selective manipulation by the operator to lead the vehicle.

5. A structure as defined in claim 4, further including a prime mover, and a clutch lever associated with the foot rest and arranged connected to the prime mover for selectively connecting the prime mover to the pivotal wheel, and wherein the handle is pivotally mounted on the foot rest and arranged for actuating the clutch when the handle is in an operator-manipulating position.

6. A structure as defined in claim 5, further including an operator's seat cantilever mounted on the steering post, the prime mover also cantilever mounted to the steering post for turning therewith and arranged for selectively rotating the pivotal wheel to propel the vehicle.

7. A structure as defined in claim 6, wherein a T-bar is cantilever mounted to the steering post for movement with the seat and is arranged for selectively receiving the operator's feet.

8. A structure as defined in claim 7, wherein the frame includes three longitudinal members arranged in plan to form the sides of a triangle, the wheels being arranged at vertexes of the triangle, and a pair of long rods arranged parallel to the steering post, each connected at a one end to a respective end of a common longitudinal member and to an end of a respective one of the other longitudinal members, and ends of the other longitudinal members spaced from the ends converge together and are connected to the rods and are provided with collars forming journals for the steering post.

9. A structure as defined in claim 8, wherein the frame further includes a pair of shock absorbers, and the other longitudinal members are attached to the rods by the shock absorbers.

10. A structure as defined in claim 4, further including an operator's seat cantilever mounted on the steering post, the prime mover also cantilever mounted to the steering post for turning therewith and arranged for selectively rotating the pivotal wheel to propel the vehicle.

11. A structure as defined in claim 10, wherein a T-bar is cantilever mounted to the steering post for movement with the seat and is arranged for selectively receiving the operator's feet.

12. A structure as defined in claim 4, wherein the frame includes three longitudinal members arranged in plan to form the sides of a triangle, the wheels being arranged at vertexes of the triangle, and a pair of long rods arranged parallel to the steering post, each connected at a one end to a respective end of a common longitudinal member and to an end of a respective one of the other longitudinal members, and ends of the other longitudinal members spaced from the ends converge together and are connected to the rods and are provided with collars forming journals for the steering post.

13. A structure as defined in claim 12, wherein the frame further includes a pair of shock absorbers, and the other longitudinal members are attached to the longitudinal rods by the shock absorbers.

14. A vehicle, comprising, in combination:
   a. a frame;
   b. steerable means attached to the frame for permitting the frame to steerably traverse a supporting surface; and
   c. means actuatable in a plurality of different ways for controlling the steerable means, the steerable means including a pivotally mounted wheel, and the means for controlling being associated with the pivotally mounted wheel and including a handwheel means connected to the pivotally mounted wheel for turning same upon being selectively turned by an operator, a foot rest cantilever mounted to the pivotally mounted wheel and arranged for being selectively engaged by at least one foot of the operator to control direction of the pivotally mounted wheel, and a handle mounted on the foot rest and arrangeable for selective manipulation by the operator to lead the vehicle.

15. A structure as defined in claim 14, wherein the steerable means includes three wheels connected to and arranged for movably supporting the frame, the frame including three longitudinal members arranged in plan to form the sides of a triangle, the wheels being arranged at vertexes of the triangle, and a pair of rods arranged parallel to the steering post, each rod connected at a one end to a respective end of a common longitudinal member and to an end of a respective one of the other longitudinal members, and ends of the other longitudinal members spaced from the ends connected to the rods arranged converging together.

* * * * *